United States Patent [19]

Parkander

[11] Patent Number: 5,174,454
[45] Date of Patent: Dec. 29, 1992

[54] METHOD FOR SORTING FORM STACKS IN STORAGE SYSTEMS AND A DEVICE FOR CARRYING OUT THE METHOD

[76] Inventor: Gothe A. K. Parkander, Sandasgatan 3, S-341 35, Ljungby, Sweden

[21] Appl. No.: 795,936

[22] Filed: Nov. 15, 1991

[51] Int. Cl.[5] .................................. B07C 5/02
[52] U.S. Cl. ........................... 209/3.3; 209/552; 209/583; 209/900; 209/933; 364/478; 414/270; 414/274; 414/282; 414/285
[58] Field of Search ............... 209/3,1, 3.3, 552, 583, 209/900, 933, 936, 534, 551; 414/267, 268, 270, 274, 277, 281, 282, 285, 287; 364/478

[56] References Cited

U.S. PATENT DOCUMENTS

| | | | |
|---|---|---|---|
| 3,573,748 | 4/1971 | Holme | 209/900 |
| 3,782,565 | 1/1974 | Doran et al. | 414/274 |
| 3,790,006 | 2/1974 | Hartman, III | 414/274 |
| 3,880,307 | 4/1975 | Peterson | 414/274 |
| 3,883,008 | 5/1975 | Castaldi | 414/270 |
| 4,168,092 | 9/1979 | Nothmann | 414/267 |
| 4,503,977 | 3/1985 | Kohno et al. | 209/900 |
| 4,789,293 | 12/1988 | Hashimoto et al. | 414/285 |
| 4,812,629 | 3/1989 | O'Neil et al. | 414/274 |
| 4,905,840 | 3/1990 | Luge et al. | 209/551 |
| 4,936,738 | 6/1990 | Brennan et al. | 414/267 |
| 5,019,249 | 5/1991 | Sugai et al. | 209/534 |
| 5,056,437 | 10/1991 | Maddock | 414/274 |
| 5,116,182 | 5/1992 | Lin | 414/282 |

FOREIGN PATENT DOCUMENTS

| | | | |
|---|---|---|---|
| 3110700 | 10/1982 | Fed. Rep. of Germany | 414/277 |
| 3305277 | 8/1984 | Fed. Rep. of Germany | 414/277 |
| 155106 | 7/1986 | Japan | 414/274 |
| 229705 | 10/1986 | Japan | 414/282 |
| 295902 | 12/1986 | Japan | 414/267 |
| 71003 | 3/1988 | Japan | 414/270 |

Primary Examiner—Robert P. Olszewski
Assistant Examiner—Steven M. Reiss
Attorney, Agent, or Firm—Tarolli, Sundheim & Covelli

[57] ABSTRACT

The method is characterized by identifying each form stack (8) with regard to the identity received during manufacture thereof, the information received regarding the identity of the form stack (8), comparing the information received regarding the identity of the form stack (8) with stored information regarding the identities of one or more form stacks (8) sorted in the storage system (11), sorting form stacks (8) with a certain identity in such compartments in the storage system (11) containing a form stack or form stacks (8) with the same identity if, during the identity comparison, it is determined that there is/are one or more form stacks (8) with the same identity in a certain compartment in the storage system (11), sorting form stacks (8) with a certain identity in a free compartment in the storage system (11) if, during the identity comparison, it is determined that there is/are not one or more form stacks (8) with the same identity in the storage system, and removing stored identity information when a form stack or form stacks (8) with this stored identity information is/are removed from the storage system (11).

30 Claims, 12 Drawing Sheets

METHOD FOR SORTING FORM STACKS IN STORAGE SYSTEMS AND A DEVICE FOR CARRYING OUT THE METHOD

TECHNICAL FIELD

The present invention relates to a method for sorting form stacks in a storage system and removing the form stacks from the storage system. The form stacks are produced by passing a continuous form web through a printer wherein the form web is printed. The form web is formed to provide form stacks which are separated from each other and fed to the storage system for sorting therein.

The invention also relates to a simple device for carrying out the method.

BACKGROUND ART

In printing all kinds of information on a moving web of continuous forms, such as messages, wage statements, invoices, etc., the printout with current techniques takes place in high-speed printers of the "impact" or, preferably, laser type. The printer is controlled by a computer with memory that contains all data required. The endless web of forms runs through the printer under automatic control of the feed simultaneously as printing is effected. The printing speed is high, which also means that the web advances at high speed.

The web is usually wound as a roll onto a bobbin from which it is fed, continuously or intermittently, into the printer and the tension of the web when fed into the printer is practically equal to zero. The same applies to the output side of the printer.

The web is also prefabricated with regard to width, margin line holes, perforations and preprint, if desired. These preparatory operations are carried out in separate machinery, usually referred to as presses. Thereafter, the web roll is delivered to the data processing center fully ready for printing.

As for perforations of the web, it should be observed that a transverse perforation is always located at a separating line between two sheets (or form lengths) so that the web can be either folded or torn off along the perforation. Other perforations may also be arranged in each separate form, e.g., for tearing off a counterfoil, a payment notice or the like.

By the folds/perforations, the web is fully prepared for the folding of the forms into a stack and this stacking is followed by so-called job separation which implies that a division of the web is effected by cutting or tearing a web at a transverse perforation between two jobs. A job is defined as a number of forms having common characteristics, such as the same text, the same customer, the same order number or the like.

As an example, it can be mentioned that the web runs through a high-speed printer at a speed of 20 m/min. up to 60 m/min. This means that during job separation, seven to eight stacks or more are obtained every minute, depending on the number of forms in each stack.

The form stacks obtained are normally transported manually to a storage location at which they are stored for collection.

Because of the high sensitivity of the printer, the manual transport work is burdensome and faults are easily made in connection therewith.

SUMMARY OF THE INVENTION

The object of the present invention is to eliminate the above-mentioned problem and provide a method which, without manual effort, makes it possible to take care of and place the form stacks in a storage system as they are received from the printer. This is arrived at according to the invention substantially by the fact that the method has obtained the characterizing features of claim 1.

The device for carrying out the method according to the invention has obtained substantially the characterizing features of claim 17.

The method according to the invention permits location of the form stacks in the storage system without manual effort and at the same speed as the form stacks are received from the printer. Thereby, the form stacks can be placed in certain components in the storage system and stored therein inaccessible to unauthorized removal therefrom.

The device according to the invention makes it possible to carry out the method with a satisfactory reliability in operation and sufficient speed.

BRIEF DESCRIPTION OF THE DRAWINGS

The invention will be further described below with reference to the accompanying drawings in which.

DESCRIPTION OF PREFERRED EMBODIMENT

Figure 1:
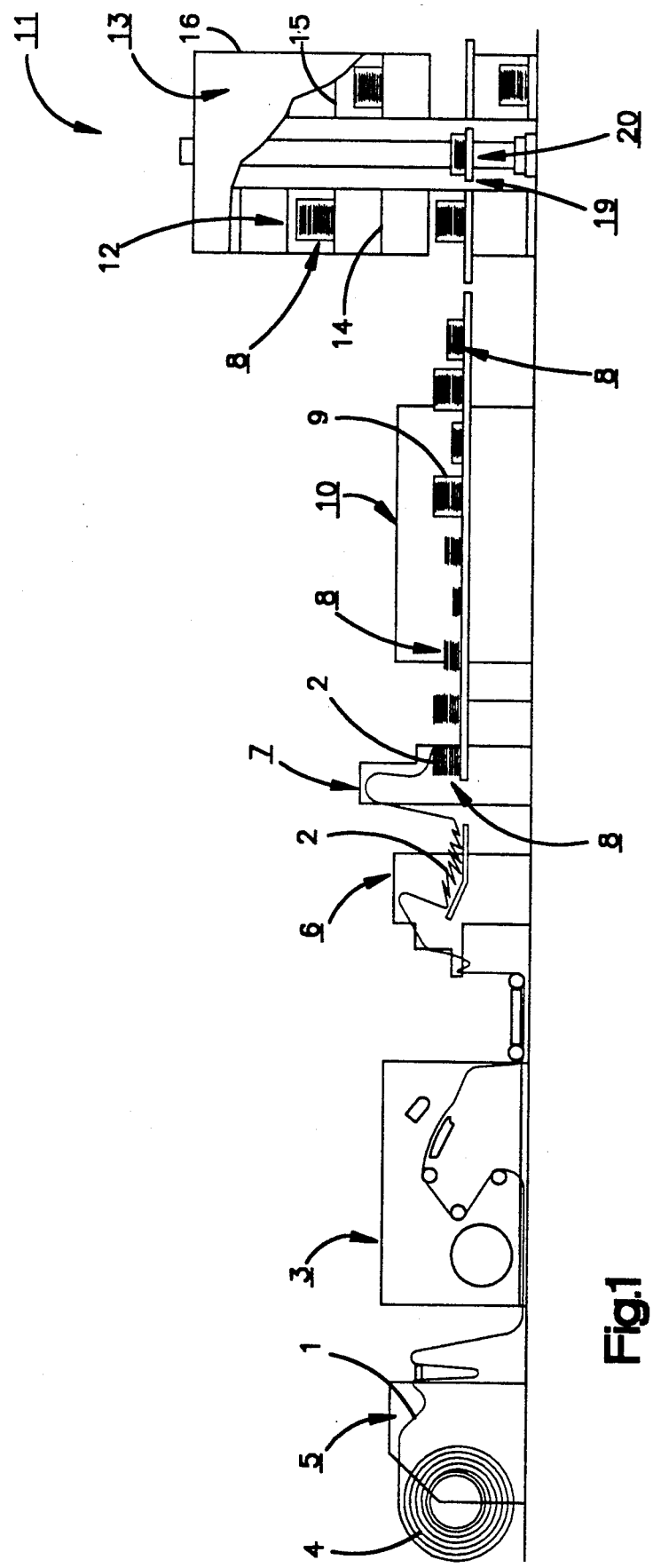
FIG. 1 is a schematic view of a storage system according to the invention connected to a printing, folding, stacking and separating machine.
Figure 2:
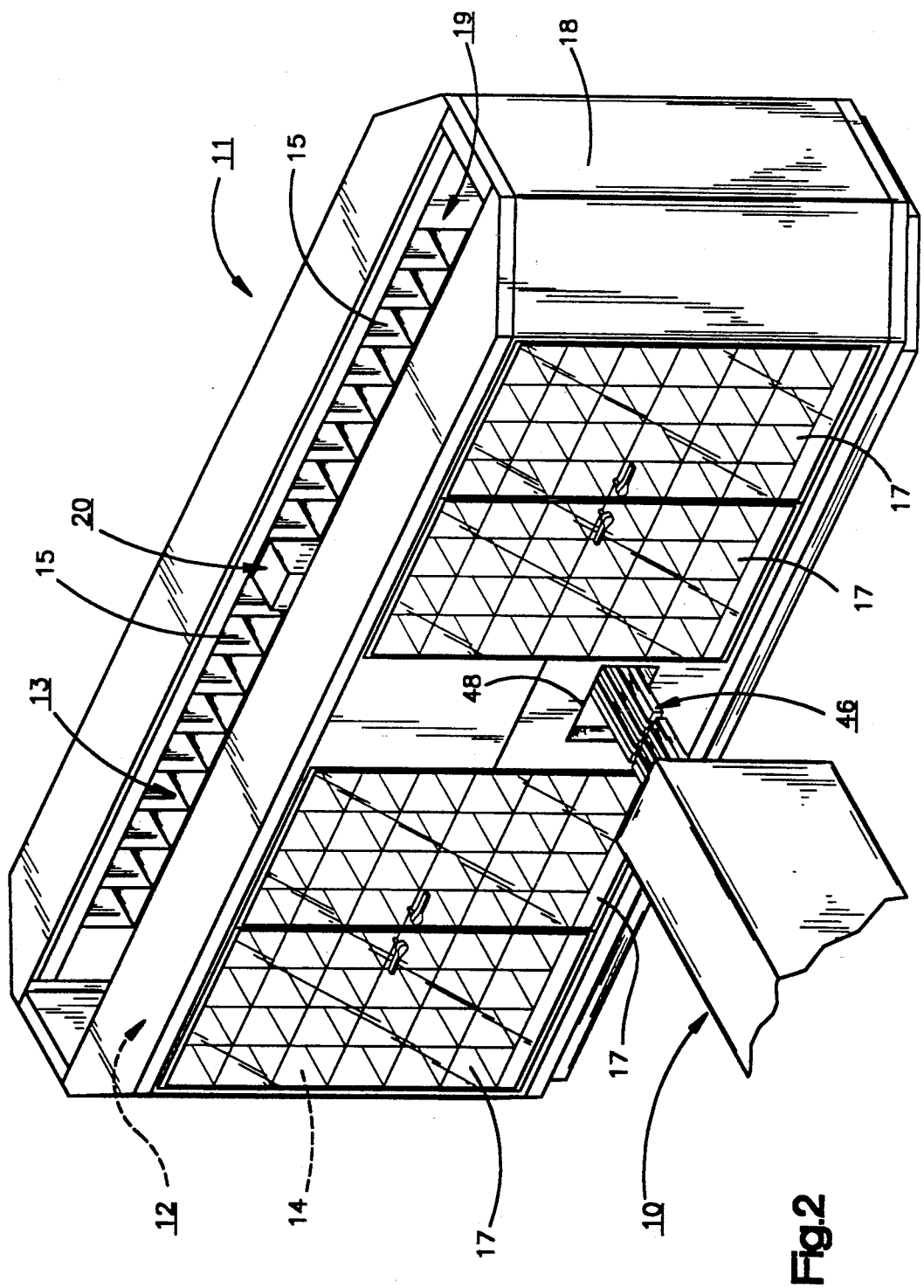
FIG. 2 is a perspective view schematically illustrating the storage system of FIG. 1.
Figure 3:
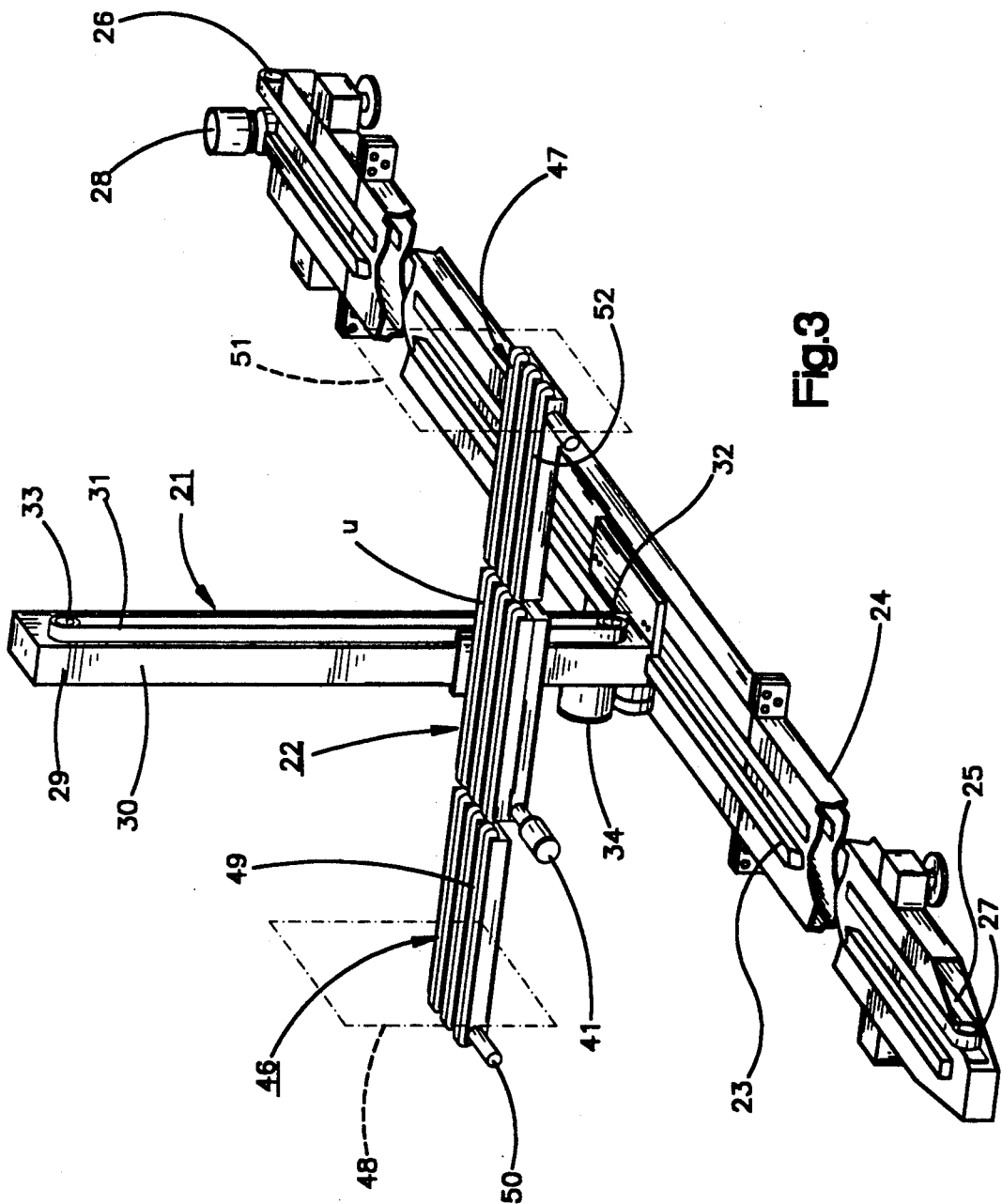
FIG. 3 is a schematic view of a sorting device forming part of the storage system according to the invention.
Figure 4:
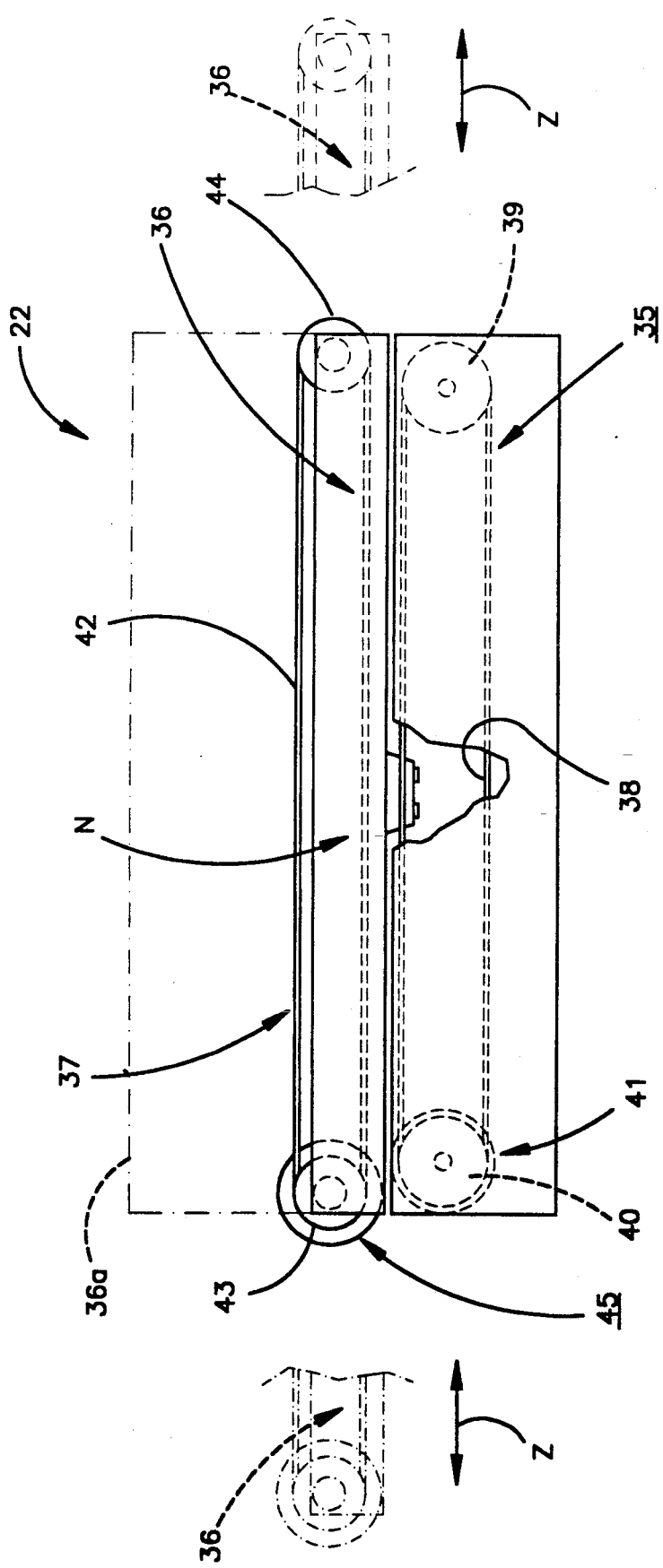
FIG. 4 illustrates a sorting table forming part of the sorting device of FIG. 3.
Figure 5:
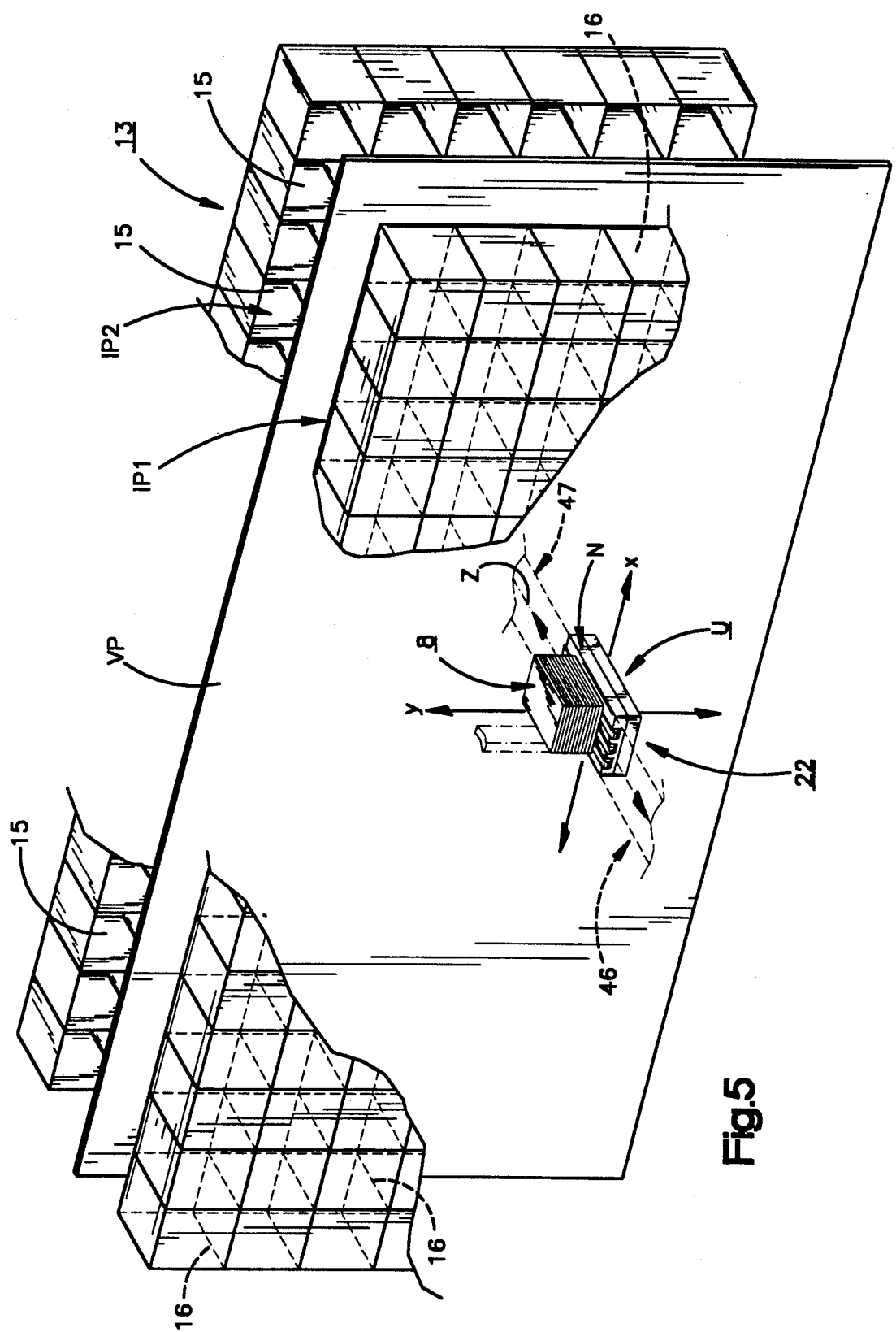
FIG. 5 schematically illustrates a vertical plane in the storage system in which the sorting table is movable.

In FIG. 1, a web 1 of continuous forms 2 is run through a printer 3 from a roll 4 mounted in a roll stand 5. The printer 3 is preferably a high-speed printer of the "impact" or laser type. The web 1 of forms 2 has been prefabricated with regard to width line holes and transverse perforations. The forms 2 of the web 1 may also have imprints thereon, such as logotypes or the like.

The web 1 of forms 2 runs without tension from the roll 4 through the printer 3 to a former 6 for zig-zag folding thereof.

From the former 6, the form web 1 runs to a stacking and separating device 7 in which the forms 2 are stacked to form stacks 8 which are separated from each other (so-called job separation), such that each form stack 8 with a certain identity contains a predetermined number of forms 2 (the number of forms in the stacks 8 may vary between two and two thousand or more). The form stacks 8 may be provided with a plastic cover 9 or a cover of another material in a device 10 adapted therefor.

The various units of the plant 3, 5, 6, 7 and 10 and their function are already known and therefore not described in more detail. It should be mentioned however, that the identity of each form stack 8, as received in the plant, is utilized for sorting in a storage system 11, for storage therein and, when required, for removal therefrom. The storage system 11 comprises preferably two compartment systems 12 and 13, whereby compartment system 12 includes a plurality of compartments 14 and compartment system 13 includes a plurality of compartments 15. These compartment systems 12, 13 are provided preferably in a closable cabinet 16 with lockable doors 17 through which the compartment systems 12, 13, when required, are accessible from the outside. Preferably, the doors 17 have transparent portions so that the sorting operation can be observed. The cabinet 16 further includes at least one lockable door 18 for access to the cabinet for service of the members therein.

The cabinet 16 also includes a longitudinal space 19 between the compartment systems 12, 13. A sorting device 20 is movable in this space 19 in such a manner that on command it can continuously sort the form stacks 8 continuously transported to the storage system 11 in suitable compartments 14 or 15. The sorting device 20 is also movable in such a manner that on command it can fetch any desired form stack 8 from its compartment 14 or 15 for removal thereof from the storage system 11.

The sorting device 20 comprises a sorting carriage 21 with a sorting table 22. The sorting carriage 21 runs on a rail 23 in the space 19 and this rail is mounted on a beam 24 at the bottom of the space 19. The sorting carriage 21 is connected to a driving belt 25 adapted to move the carriage along the rail 23. The driving belt 25 is preferably of tooth belt type and runs around a driving wheel 26 and a guide wheel 27, which preferably are journalled at opposite end portions of the beam 24. The driving belt 25 is driven by a motor 28 operating the driving wheel 26.

The sorting carriage 21 comprises a column 29 along which the sorting table 22 is movable in vertical direction. The column 29 includes a rail 30 along which the sorting table 22 is slidable and the sorting table is driven by a driving belt 31 on which it is secured. The driving belt 31 is preferably of tooth belt type and runs around a driving wheel 32 at the bottom of the column 29 and a guide wheel 33 at the top of the column 29. Operation or movement of the sorting table 22 in vertical direction is accomplished by means of a motor 34 mounted on the sorting carriage 21 and operating the driving wheel 32 of the driving belt 31.

The sorting table 22 comprises a lower member 35 and an upper member 36 which is displaceably mounted on the lower member 35 and which is provided with a feeding device 37. For displacing the upper member 36, the lower member 35 preferably includes a continuous driving belt 38 running around two guide rolls 39, 40 of which the roll 40 is operated by a driving motor 41. Since the upper member 36 is fixedly connected to the driving belt 38, the driving motor 41 can operate the upper member 36 such that it protrudes a small distance beyond one end edge of the lower member 35.

The feeding device 37 on the upper member 36 of the sorting table 22 preferably consists of a plurality of (e.g. three) continuous or endless feed belts 42 running around two guide rolls 43, 44 of which one roll 43 is operated by a driving motor 45 mounted on the upper member 36. The feeding device 37 is adapted to receive form stacks 8, carry the form stacks during movement of the sorting carriage 21 and sorting table 22 to the respective compartment 14 or 15, aid in feeding the form stacks down into the compartment and participate in fetching the form stacks 8 from the respective compartment 14 or 15. In order to ensure that the form stacks 8 remain on the sorting table 22 during its movement, the sorting table is provided with two shields 36a running along the longer sides thereof.

The sorting table 22 can be set in a starting position U in which it is situated aligned with a transport device 46 for transporting form stacks 8 from the printer 3 and associated machines to the sorting table 22. In starting position U, the sorting table 22 is also aligned with a discharge device 47 for discharging or feeding out form stacks 8 from the sorting table 22 and out of the storage system 11.

The transport device 46 is connected to the printer 3 and associated machines in such a way that it can continuously receive form stacks 8 as they are produced in the machines associated with the printer 3. The transport device 46 can continuously feed the form stacks 8 to the sorting table 22 through a lid 48 in the cabinet 16 and the transport device 46 may preferably include three conveyor belts 49 operated by a driving motor 50. The discharge device 47 is adapted to receive the form stacks 8 from the sorting table 22 and feed them out of the storage system 11 through a lid 51 in the cabinet 16, and it includes preferably three conveyor belts 52 operated by a driving motor 53.

The upper member 36 of the sorting table 22 is sized such that it can be inserted a short distance into the compartments 14 or 15, whereby the upper member 36 of the sorting table 22 is inserted into a compartment a short distance for delivering a form stack 8 therein. When a form stack 8 is to be fetched from one compartment, the upper member 36 is inserted into another compartment located beneath the one compartment and then raised into the one compartment with the form stack 8 until the form stack lies on the feeding device 37 and can be removed from the compartment by withdrawing the upper member 36 from the compartment.

Figure 10:
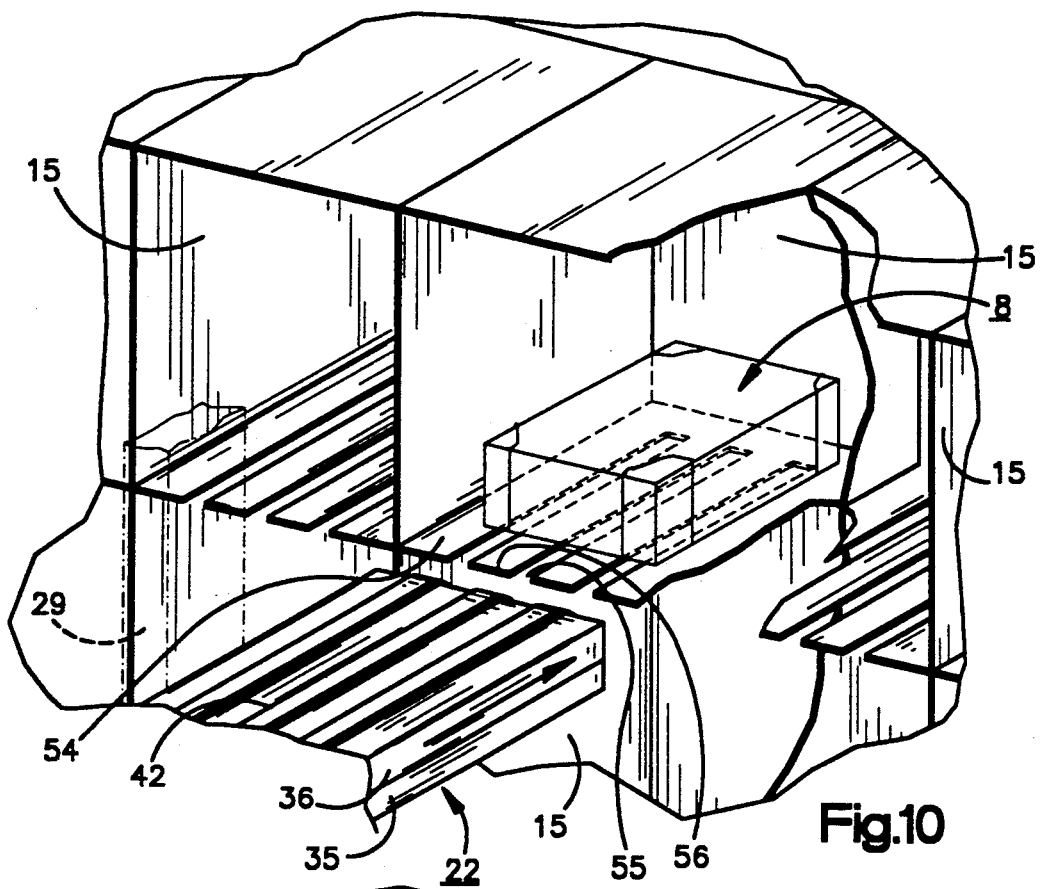
FIG. 10 is a perspective view schematically illustrating the sorting table set close to a compartment which is situated under a compartment from which a form stack is to be fetched.
Figure 11:
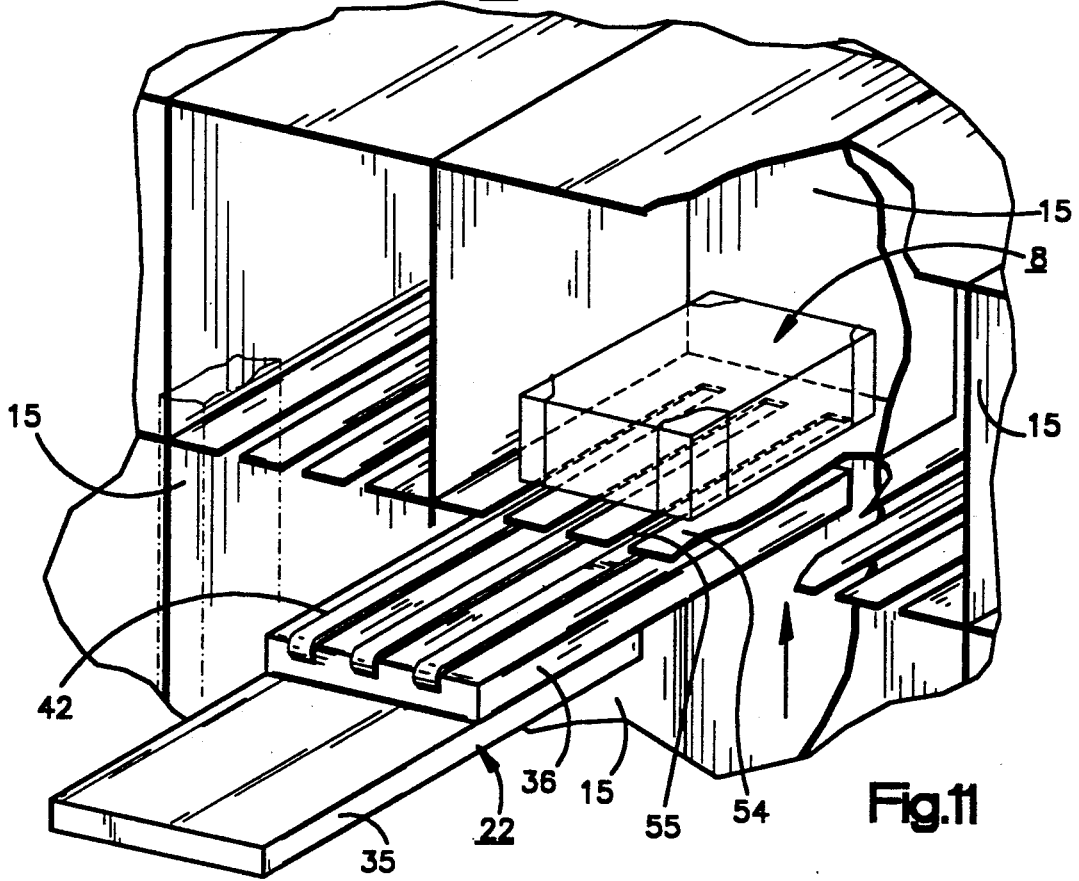
FIG. 11 is a perspective view schematically illustrating the sorting table inserted into the lower compartment.
Figure 12:
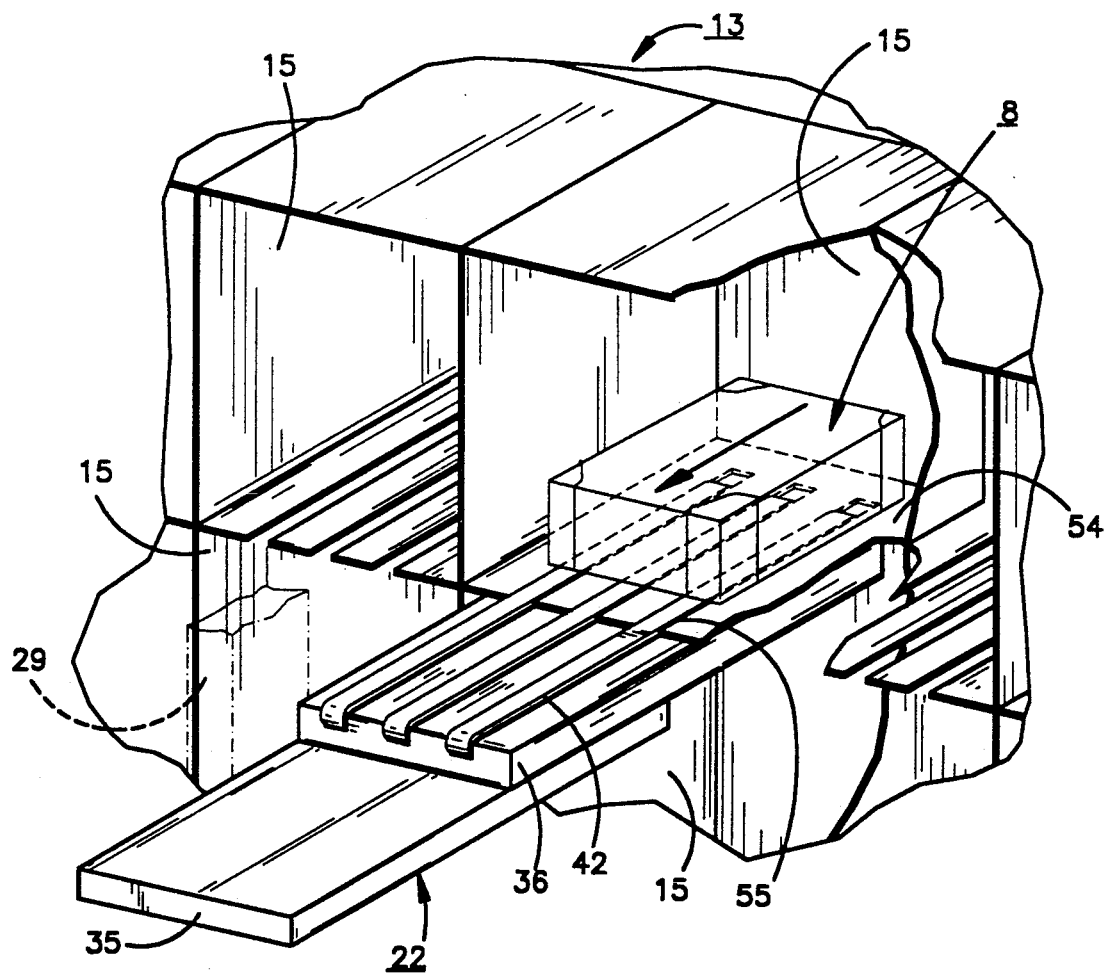
FIG. 12 is a perspective view schematically illustrating the sorting table raised such that the feeding device thereof lifts the form stack.

In order to accomplish this removal with a simple design of the compartments 14 or 15, the bottoms 54 thereof have three grooves 55 (or another suitable number of grooves) which extend from the front edges 56 of the bottoms 54 and backwards a substantial distance into the compartments (see FIG. 10). These grooves 55 are sized and located such that the feed belts 42 of the feeding device 37 from below can be moved upwards into the grooves by raising the sorting table 22 from a position under the bottom 54 when the upper member 36 thereof is inserted into the compartment beneath the bottom 54 of the compartment (see FIG. 11). Thus, the sorting table 22 can be raised so much that the feed belts 42 of the upper member 36 are elevated to a position somewhat above the bottom 54 such that a form stack 8 lying on the bottom is lifted therefrom and instead carried by the feed belts 42 of the upper member 36. If portions of the form stack 8 lying farthest inside the compartment cannot be reached by the feed belts 42, i.e., the entire form stack 8 is not carried by the upper member 36, then the feed belts 42 can be driven in a direction out of the compartment (see FIG. 12) until the entire form stack 8 is located on the upper member 36 which at the same time or thereafter is withdrawn from the compartment.

Figure 13:
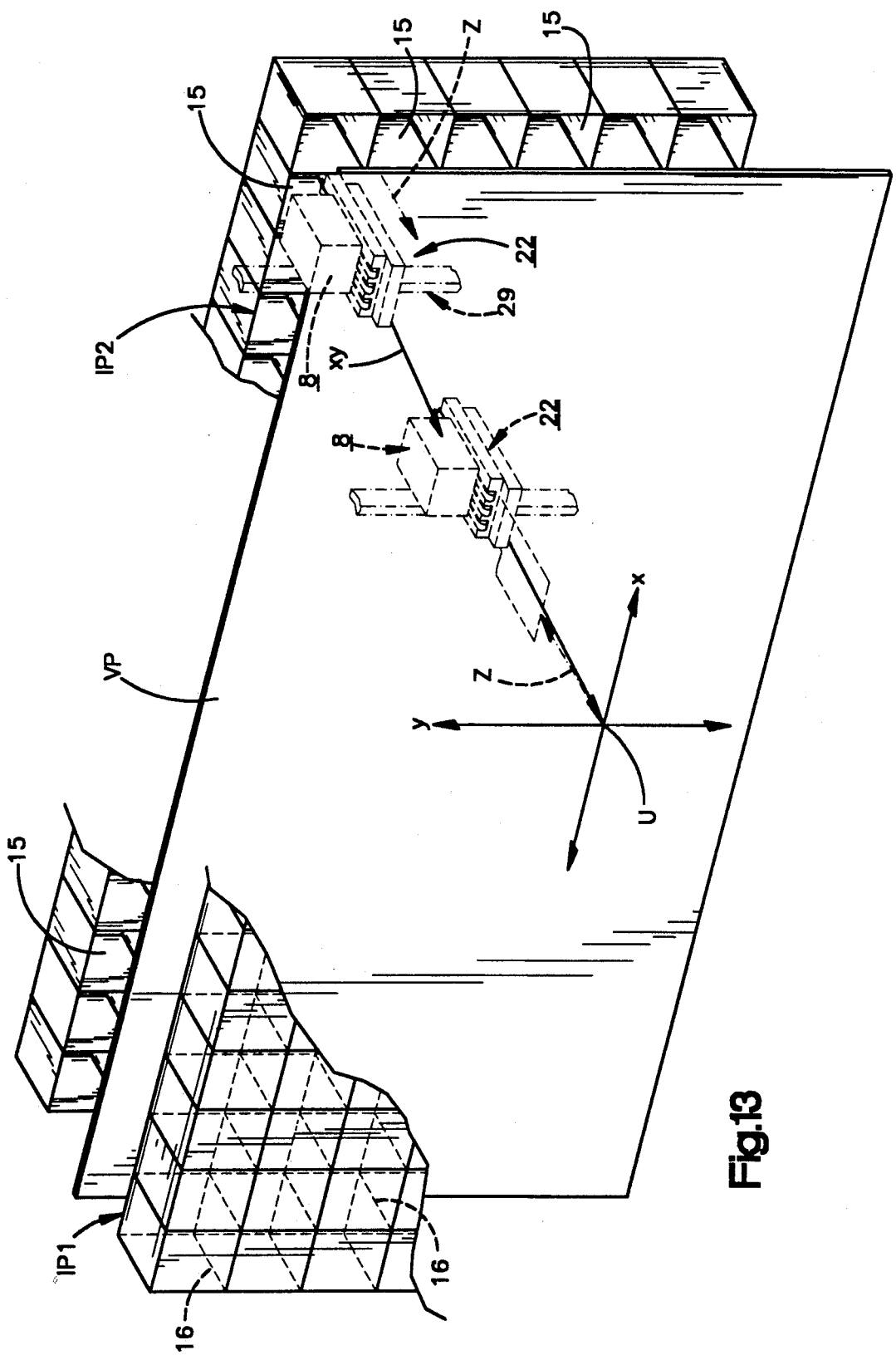
FIG. 13 is a perspective view schematically illustrating how the sorting table with form stack moves in the vertical plane from a position close to the compartment from which the form stack is fetched for transport to the starting position.

When the upper member 36 with the form stack 8 lying thereon is completely withdrawn from the compartment to a neutral position N on the lower member 35 (see FIG. 13), the sorting table 22 is returned to its starting position U and the form stack 8 is fed by the feeding device 37 to the discharge device 47 and through that discharged from the storage system 11. Form stacks 8 can be left and fetched from all compartments in the same way by means of the sorting carriage 21.

The device described above is controlled by the following means and in the following manner.

Figure 14:
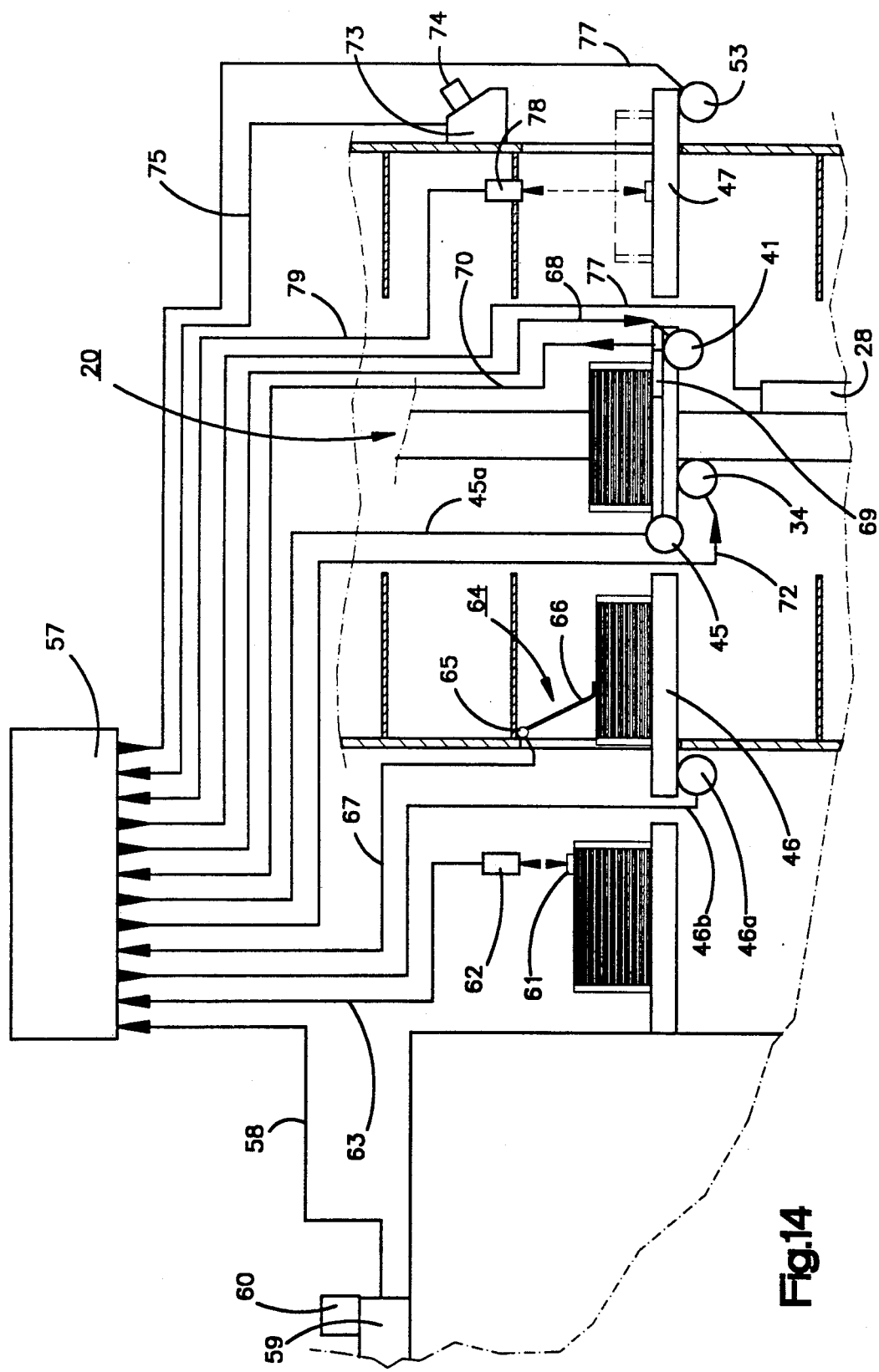
FIG. 14 schematically illustrates a control device for controlling the sorting device.

The control device 57 schematically illustrated in FIG. 14 comprises a computer with a memory for, among other things, receiving, storing, and comparing signals as well as for generating and emitting signals regarding various control commands. The control device 57 is, preferably through a line 58, connected to an electronic control system 59 with computer programs for controlling the printer 3 and associated machines.

Predetermined information can, through a push-button board 60 for example, be fed into the control system 59 for marking the form stacks 8 with required identity markings 61 in the printer 3 or associated machines. Information regarding these identity markings 61 are fed through line 58 to the control device 57 wherein the information is stored. When a form stack 8 with, among other things, a predetermined print and a predetermined number of forms and having a certain identity marking 61 is completed, the form stack is fed continuously with other form stacks to the sorting device 20, whereby a sensor 62 reads the identity marking of the form stack and feeds through a line 63 a signal corresponding to the identity to the control device 57. The form stack 8 is fed into the storage system 11 through the transport device 46 by feeding a commanding signal from the control device 57 to its motor 46a through a line 46b, whereby the form stack 8 is brought to cooperate with a height measuring device 64 comprising preferably a plurality of, e.g. three, arms 66 which are mounted on a horizontal axis 65 and pivotable in vertical direction. When the form stack 8 reaches these arms 66, it pivots the arms upwards and the value of the degree of pivotal movement is transferred by means of a signal transmitter (not shown) and through a line 67 to the control device 57. The degree of pivotal movement of the arms 66 can, for example, be transferred to a potentiometer which is turned in dependence thereof and the value obtained is transferred to the control device 57 through the line.

Thereafter, the transport device 46 transports the form stack 8 to the sorting table 22. Eventually, the motor 41 for operating the upper member 36 in the direction of the arrow Z relative to the lower member 35 can receive a commanding signal through line 68 so that the feeding device 37 of the sorting table 22 is driven towards the transport device 46 if this is required for facilitating the transfer of the form stack 8 from the transport device 46 to the sorting table 22. The arrival of the form stack 8 to the sorting table 22 is sensed by a sensor 69 and the sensor feeds a corresponding signal to the control device 57 through a line 70.

When the identity signal has been fed into the control device 57, it is stored in the computer memory and compared with identity signals previously fed into the computer memory for determining whether or not there are already form stacks with the same identity in any compartment or compartments in the storage system 11. Furthermore, it is determined in the control device 57 by means of the height measuring signal from the height measuring device 64 whether or not there is room for the incoming form stack 8 of a certain identity in a certain compartment where there is already a form stack 8 with the same identity.

The program stored in the control device 57 permits sorting of the incoming form stack 8 in a free compartment as close as possible to the starting U of the sorting table 22 if it is determined in the control device 57 that there are no other form stacks 8 with the same identity in the storage system 11. However, if it is determined in the control device 57 that there are already form stacks 8 with the same identity as the incoming form stack 8, the incoming form stack is either fed into the same compartment as the form stacks with the same identity or, if there is no room in the same compartment, placed in an adjacent compartment, preferably a compartment located next to and, if possible, closer to the starting position U than the compartment already occupied.

Movement of the form stack 8 is carried out, more exactly, so that the control device 57 through a line 71 feeds the motor 28 of the sorting carriage 21 with the required commanding signal for driving the carriage 21 along the rail 23 and, thus, the sorting table 22 with the form stack 8 thereon in horizontal direction X in an imaginary vertical plane VP in the space 19 between the two compartment systems 12, 13 If the compartment in which the form stack 8 shall be placed is situated at the same level as the sorting table 22 in its starting position U, then the sorting table 22 is not moved in vertical direction Y in the vertical plane VP. However, a commanding signal can be fed to the motor 41 of the sorting table 22 for operating the upper member 36 of the sorting table along the Z-axis simultaneously with the movement of the sorting table along the X-axis, i.e., perpendicular to the vertical plane VP, until the feeding device 37 on the upper member 36 of the sorting table 22 is situated in close proximity to an inlet plane IP1 or IP2 including the inlet openings of the compartments. This movement along the Z-axis is of course carried out only if the upper member 36 is not already in the desired position close to either inlet plane IP1 or IP2 when the sorting table 22 starts to move from the starting position U.

Figure 9:
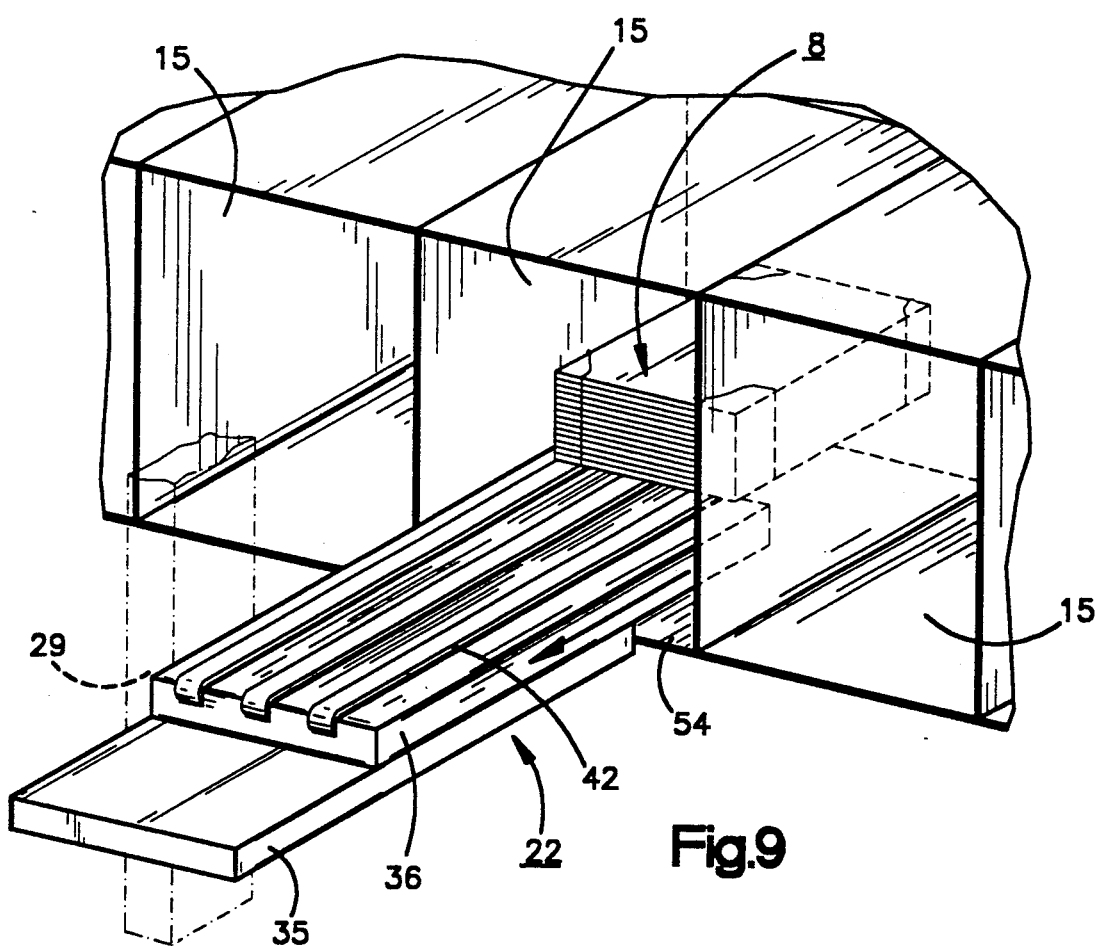
FIG. 9 is a perspective view schematically illustrating the movements of the sorting table and feeding device for laying down the form stack in the compartment.

When the sorting table 22 is moved to a position just opposite to the compartment in question, the control device 57 feeds a commanding signal through line 68 to the motor 41 to insert the upper member 36 of the sorting table 22 along the Z-axis into the compartment. When the upper member 36 has reached a certain position in the compartment, the control device 57 feeds commanding signals to the motors 41, 45 through lines 68 and 45a, respectively, such that the upper member 36 is displaced along the Z-axis out of the compartment while at the same time the feeding device 37 feeds the form stack 8 from the upper member 36. These movements are preferably coordinated with each other so that the form stack 8 falls straight down or substantially straight down onto the location 54 of the compartment (see FIG. 9).

After delivery of the form stack 8 in the compartment and withdrawal of the upper member 36 therefrom, the control device 57 feeds a commanding signal to the sorting device to return the sorting table 22 to starting position U.

Figure 6:
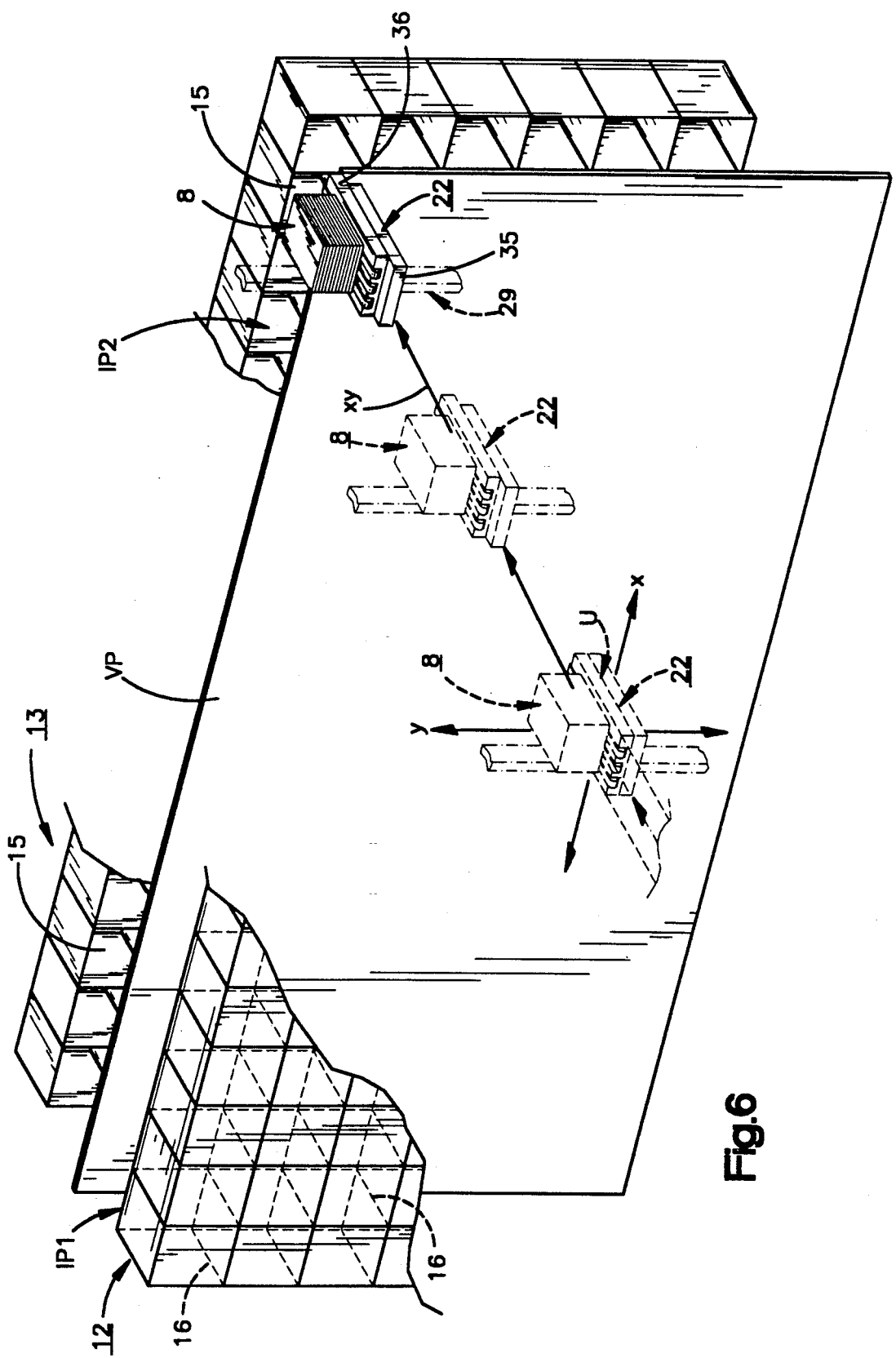
FIG. 6 schematically illustrates along which path the sorting table with a form stack can be moved from a starting position for placing the form stack in a compartment in the storage system.
Figure 7:
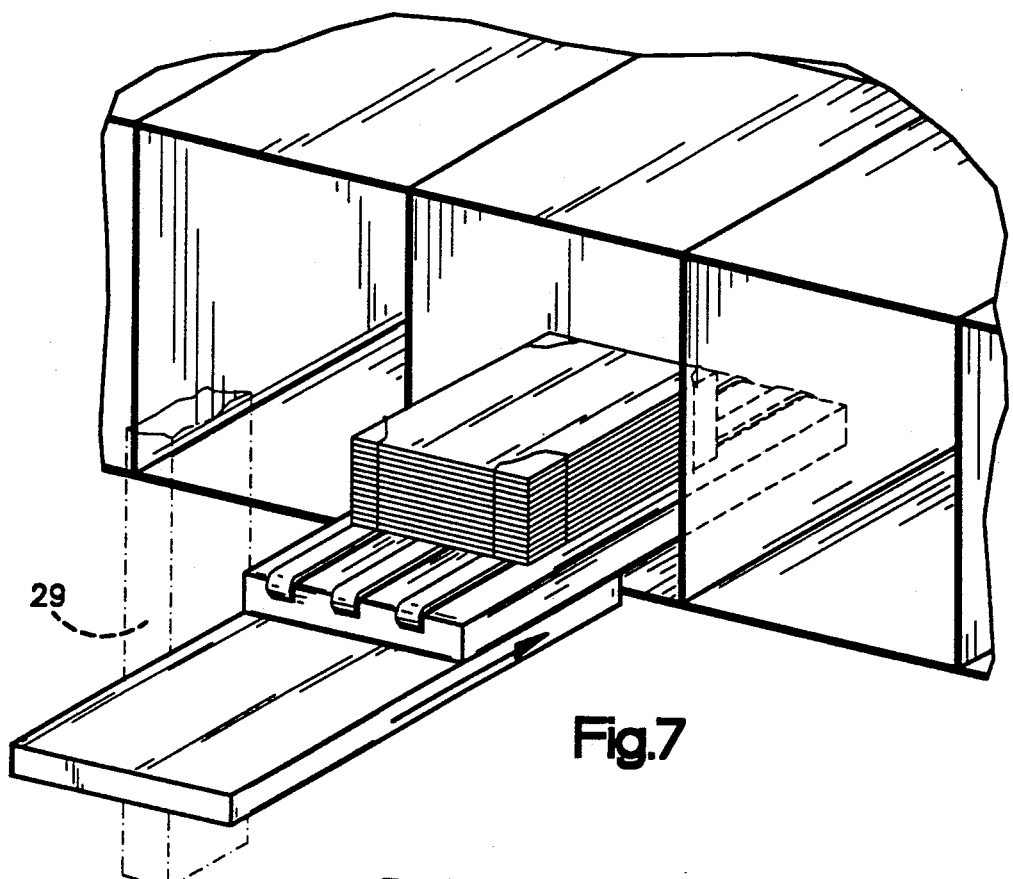
FIG. 7 is a perspective view schematically illustrating how the sorting table with the form stack can be moved from the position close to the compartment of FIG. 6 and into the compartment.
Figure 8:
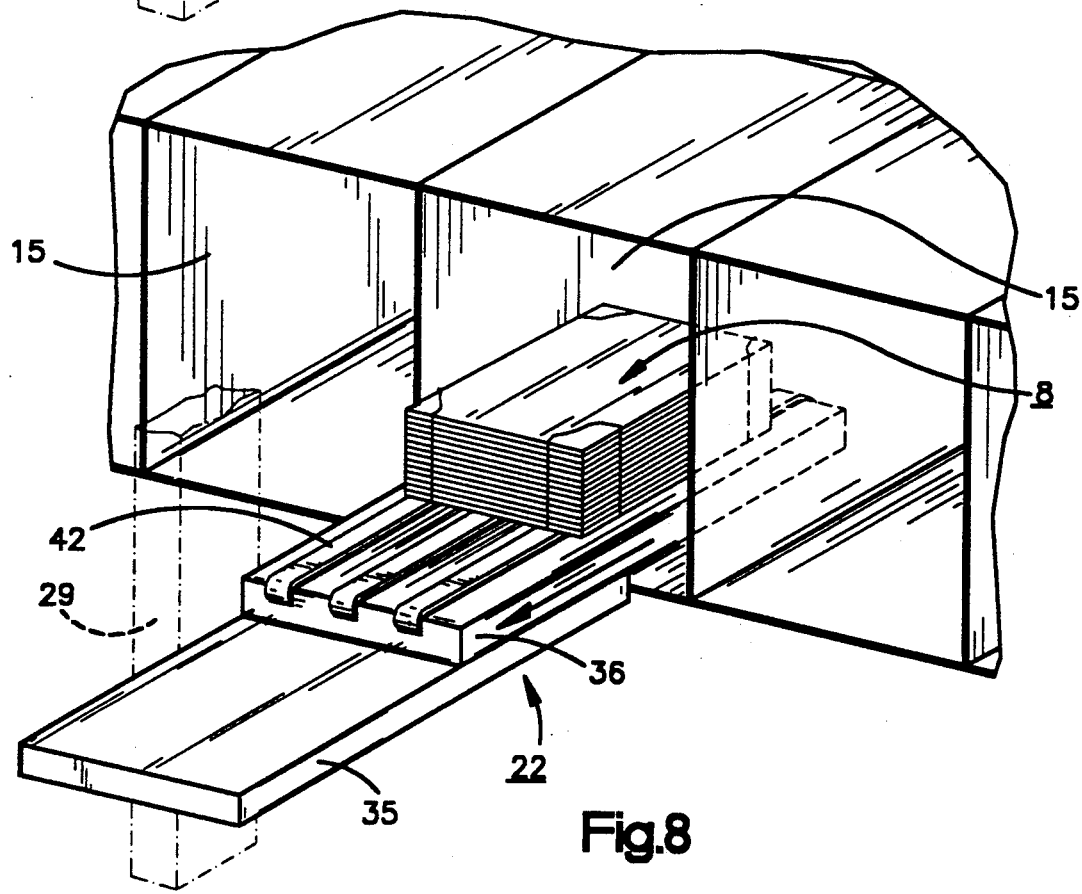
FIG. 8 is a perspective view schematically illustrating how the sorting table and a feeding device provided thereon move for leaving the form stack in the compartment.

If the compartment in which the form stack 8 shall be placed is not located at the same level as the sorting table 22 in its starting position U, the control device 57 feeds a commanding signal through a line 72 to the motor 34 for moving the sorting table 22 in vertical direction Y in the vertical plane VP until the sorting table has reached the correct level. This movement along the Y-axis is carried out preferably simultaneously with the movement of the sorting table 22 along the X-axis. Hereby, the sorting table 22 will move the shortest way in XY-direction (see FIGS. 6 and 13) between the starting position U and the compartment and vice versa, which is time saving.

Removal of form stacks 8 from the storage system 11 can only be carried out by an authorized person having access to the required fetch code. The code can be tapped into a removal or fetch device 73 (or a key 74 with the fetch code can be inserted thereinto) which feeds a fetch signal through a line 75 to the control device 57. If the fetch code is correct, the control device 57 feeds commanding signals to the sorting device 20 so that the sorting table 22 is moved from its starting position U in X- or XY-direction in the vertical plane VP (and eventually also in Z-direction) until it reaches a position in front of a compartment which is located under the compartment from which a form stack shall be removed (see FIG. 10).

Thereafter, the control device 57 feeds a commanding signal to insert the upper member 36 of the sorting table 22 into the lower compartment immediately beneath the bottom 54 of the upper compartment. When the upper member 36 is inserted into the lower compartment, the control device 57 generates a commanding signal to raise or elevate the sorting table 22 (see FIG. 11) until the feeding device 37 of the sorting table 22 has lifted at least portions of the form stack 8 from the bottom 54. Thereafter, the control device 57 preferably generates a commanding signal to move the entire form stack 8 up onto the upper member 36 by means of the feeding belts 42 of the feeding device 37 (see FIG. 12). When the form stack 8 in its entirety is situated on the upper member 36 of the sorting table 22, the control device 57 generates a commanding signal to remove or withdraw the upper member 36 from the compartment and when this is done, the control device 57 feeds a commanding signal or signals to the sorting device 20 to return the sorting table 22 with the form stack to the starting position U (see FIG. 13).

Thereafter, the control device 57 generates a commanding signal to feed the form stack 8 from the sorting table 22 to the discharge device 47 by means of the feeding device 37. The discharge device includes a motor 53 which through a line 77 receives a commanding signal to discharge or feed the form stack 8 out of the storage system 11. This removal or discharge is read by a sensor 78 which through a line 79 feeds a discharge signal to the control device 57 such that the removal is registered therein.

When a form stack 8 with a certain identity has been removed from the storage system 11, the compartment from which the form stack has been removed is preferably free for use for a form stack with another identity. If the upper member 36 of the sorting table 22 must be moved closer to the discharge device 47 for transferring the form stack 8 from the sorting table 22 to the discharge device 47, the control device 57 generates a commanding signal to displace the upper member 36 along the Z-axis towards the discharge device.

According to these functions, the sorting table 22 can leave form stacks 8 in all compartments 14 in one compartment system 12 as well as in all compartments 15 in the other compartment system 13. Furthermore, the sorting table 22 can fetch or remove form stacks 8 from all these compartments.

The control device 57 is preferably in accordance with a certain program and on an automatic or manual command, capable of moving form stacks 8 between various compartments such that form stacks 8 of a certain identity but less frequently handled in the storage system 11 are moved from compartments closer to the starting position U of the sorting table 22 to compartments farther away from the starting position, while form stacks with another identity and more frequently dealt with in the storage system 11 are transferred to compartments closer to the starting position U.

The speed of the sorting device 20 is adapted to that of the printer 3, so that form stacks 8 continuously produced in the printer 3 and associated machines are continuously sorted in the storage system 11 without interruptions between the continuous production and the continuous sorting. Removal of form stacks 8 from the storage system 11 occurs of course only when no feed into the system takes place.

The method and device according to the invention are not limited to the above description, but may vary within the scope of the following claims. Thus, the cabinet 16 of the storage system 11 may have another shape and the doors 17 therein can be untransparent and opened only by authorized personnel. Additionally, the cabinet 16 of the storage system 11 may have only one compartment system instead of two and the lids 48, 51 as well as the starting position U of the sorting table 22 can be located in one end of the storage system 11 instead of in the center thereof, and the storage system 11 can be expandable such that it contains more compartments. It is also possible to permit manual removal of the form stacks 8 by opening the rear side of the compartments by means of a special code or key instead of feeding out the stacks by means of a discharge device 47. The sorting carriage 21 and sorting table 22 of the sorting device 20 can be designed in other ways than shown. The driving motors 41 and 45 of the sorting table 22 may, for example, be only one separate motor (not shown) with two electromagnetic couplings through which the separate motor is connected either to the upper member 36 for movement thereof or to the feeding belts 42 of the feeding device 37 for operating the belts. All units forming part of the storage system 11 are preferably sized such that they can be demounted into members with a maximum length of about 1.5-2 m and with such a weight that each member can be carried by one man.

When stacking continuous webs 1 of forms, the unit 7 comprises a stacking and separating device wherein the form stacks 8 are formed and when they are formed, they are also separated from the following form web 1, the forms of which define a new form stack 8, and so on. However, it is also possible to produce or form the form stacks of separate forms 2, i.e., instead of forms 2 which hang together in an endless or continuous web 1, and if so, the unit 7 consists only of a stacking device since the separating function is omitted.

Having described the invention, the following is claimed:

1. Method for sorting form stacks in a storage system and removing the form stacks from the storage system, the form stacks (8) being produced by passing a continuous form web (1) through a printer (3) wherein the form web is printed, the forms (2) obtained being stacked to provide form stacks (8) which are fed to the storage system (11) for sorting therein, characterized by
   identifying each form stack (8) with regard to the identity received during manufacture thereof;
   storing the information received regarding the identity of the form stack (8);
   comparing the information received regarding the identity of the form stack (8) with stored information regarding the identities of one or more form stacks (8) sorted in the storage system (11);
   sorting form stacks (8) with a certain identity in such compartments in the storage system (11) containing a form stack or form stacks (8) with the same identity if, during the identity comparison, it is determined that there is/are one or more form stacks (8) with the same identity in a certain compartment in the storage system (11);
   sorting form stacks (8) with a certain identity in a free compartment in the storage system (11) if, during the identity comparison, it is determined that there is/are not one or more form stacks (8) with the same identity in the storage system; and
   removing stored identity information when a form stack or form stacks (8) with this stored identity information is/are removed from the storage system (I).

2. Method according to claim 1, characterized by sorting the form stacks in the storage system (11) such that they are stored inaccessible to unauthorized removal therefrom and that removal of a form stack or form stacks (8) from the storage system (11) is possible only by using a code or key corresponding to the identity of this or these form stacks (8).

3. Method according to claim 1, characterized by measuring the height and/or width of the form stack (8);
   storing information that a form stack (8) with a certain identity has a certain height and/or width;
   comparing information received about the height and/or width of a form stack (8) with a certain identity with such previously stored information about height and/or width of a form stack (8) with the same identity;
   sorting a form stack (8) with a certain identity into a compartment already containing a form stack or form stacks (8) with the same identity if, during the comparison of information, it is determined that there is sufficient room for another form stack in the compartment (14 or 15); and
   sorting a form stack (8) with a certain identity into an adjacent compartment (14 or 15) if, during the comparison of information, it is determined that there is/are a form stack or form stacks (8) with the same identity in a compartment (14 or 15) but not sufficient room therein for another form stack (8).

4. Method according to claim 1, characterized by sorting form stacks into the compartments (14 or 15) of the storage system (11) from a starting position; and
   sorting form stacks (8) first into free compartments (14 or 15) or in compartments (14 or 15) with sufficient room closest to the starting position and then successively farther away from the starting position.

5. Method according to claim 1, characterized by sorting form stacks (8) into the compartments (14 or 15) of the storage system (11) from a starting position;
   moving a form stack (8) with a certain identity from a compartment into which is sorted to a compartment closer to the starting position if form stacks (8) with this identity are dealt with in the storage system (11) more frequently than form stacks (8) with another identity; and
   moving a form stack (8) with a certain identity from a compartment into which it is sorted to a compartment farther away from the starting position if form stacks (8) with this identity are dealt with less frequently than form stacks (8) with another identity.

6. Method according to claim 1, characterized by moving a form stack (8), during sorting into the compartments (14 or 15) of the storage system (11), the shortest way between a starting position and the compartment (14 or 15) wherein it shall be placed and, during removal, the shortest way between the compartment (14 or 15) and the starting position.

7. Method according to claim 1, characterized by moving a form stack (8) in the storage system (11) from a starting position to compartments (14 or 15) provided therefor along the X-, Y- and Z-axes;
   whereby movement of the form stack (8) along the X-axis means movement in horizontal direction in a vertical plane located close to inlets to the compartments of the storage system (11);
   whereby movement of the form stack (8) along the Y-axis means movement in vertical direction in the vertical plane; and
   whereby movement of the form stack (8) along the Z-axis means movement out of the vertical plane in horizontal direction towards the compartment in which the form stack (8) shall be placed.

8. Method according to claim 7, characterized in that the movement of a form stack (8) along the Z-axis also means movement of the form stack (8) out of the vertical plane towards a removing device through which the form stack is removed from the storage system (11).

9. Method according to claim 7, characterized by moving the form stack (8) simultaneously along the X-and Y-axes for movement thereof the shortest way from the starting position to the compartment in which it shall be placed; and moving the form stack (8), during movement thereof along the X-axis and eventually along the Y-axis, preferably also along the Z-axis for movement, and during such movement along the X-axis and eventually along the Y-axis, closer to a vertical inlet plane to the compartment wherein the form stack shall be placed.

10. Method according to claim 7, characterized by moving the form stack (8) along the X-axis and eventually along the Y-axis in the same vertical plane located between two compartment systems (12 or 13) on opposite sides thereof and eventually along the Z-axis towards an inlet plane for the compartments in one of the compartment systems depending on in which compartment system the form stack shall be placed.

11. Method according to claim 7, characterized by moving the form stack (8) along the X-axis in the vertical plane either in one direction relative to the starting position or in the opposite direction for disposal thereof in compartments either on one side of the starting position or on the other side thereof.

12. Method according to claim 1, characterized by
placing a form stack (8) on a feeding device on a sorting table in the storage system;
moving the sorting table to the inlet of the compartment in which the form stack (8) shall be placed;
moving the sorting table into the compartment for leaving the form stack therein; and
operating the feeding device in a downward feeding direction for feeding the form stack down from the sorting table to the compartment.

13. Method according to claim 12, characterized by withdrawing the sorting table from the compartment while simultaneously feeding the form stack down from the sorting table by means of the feeding device.

14. Method according to claim 13, characterized by feeding the form stack (8) straight down or substantially straight down by coordinating the feeding speed of the feeding device and the speed of withdrawal of the sorting table with each other.

15. Method according to claim 12, characterized by
fetching a form stack or form stacks (8) from a compartment by moving the sorting table in under the compartment;
raising the sorting table until the form stack or form stacks lie on the feeding device of the sorting table;
operating the feeding device in fetching direction until the form stacks (8) are fully positioned on top of the sorting table; and
moving the sorting table out of the compartment at the same time or thereafter.

16. Method for sorting form stacks in a storage system and removing the form stacks from the storage system, a web (1) of forms ready for printing being fed through a printer (3), preferably a high-speed printer in which the form web (1) is printed, the forms (2) obtained being stacked to provide form stacks (8), each form stack (8) being provided with a marking for identification thereof, each form stack (8) being continuously fed to the storage system (11) for sorting and storage therein at the same or substantially the same speed as they are obtained, characterized by
identifying each form stack (8) with regard to the identity received during manufacture thereof;
storing the information received regarding the identity of the form stack (8);
comparing the information received regarding the identity of the form stack (8) with stored information regarding the identities of one or more form stacks (8) sorted in the storage system (11);
sorting form stacks (8) with a certain identity in such compartments in the storage system (11) containing a form stack or form stacks (8) with the same identity if, during the identity comparison, it is determined that there is/are one or more form stacks (8) with the same identity in a certain compartment in the storage system (1);
sorting form stacks (8) with a certain identity in a free compartment in the storage system (11) if, during the identity comparison, it is determined that there is/are not one or more form stacks (8) with the same identity in the storage system; and
removing stored identity information when a form stack or form stacks (8) with this stored identity information is/are removed from the storage system (11).

17. Device for sorting form stacks in a storage system and removing the form stacks from the storage system, a printer (3) being provided for printing a continuous web (1) of forms, the forms being stacked into form stacks (8) in a device (7) adapted therefor, the form stacks (8) being transported continuously to the storage system (11) for continuous sorting into compartments (14 and/or 15) therein, characterized in that
a control device (57) is provided to emit commanding signals for controlling a sorting device (20) such that the sorting device (20) receives form stacks (8) and moves the form stacks (8) to the compartments (14 and/or 15) in the storage system (11), the control device (57) being provided to emit commanding signals for controlling the sorting device (20) to place a form stack (8) with a certain identity in a compartment (14 or 15) selected by the control device (57) depending upon whether or not there are form stacks (8) with the same identity in the compartments (14, 15) of the storage system (11).

18. Device according to claim 17, characterized in that the control device (57) is provided to emit or feed commanding signals to the sorting device (20) for controlling the sorting device (20) to place form stacks (8) in compartments (14 or 15) as close as possible to a starting position (U) into which the form stacks (8) are transported.

19. Device according to claim 17, characterized in that the control device (57) is provided to receive information about the identity of an incoming form stack (8), store this information and compare it with previously stored information about the identity of form stacks (8), and that the control device (57) is provided to emit commanding signals for controlling the sorting device (20) to place form stacks (8) with a certain identity in compartments (14 or 15) containing form stacks (8) with the same identity or in an adjacent compartment (14 or 15) if there is no room for the incoming form stack (8) in the same compartment (14 or 15).

20. Device according to claim 17, characterized in that it includes a height and/or width measuring device (64) which is adapted to measure the height and/or width of form stacks (8) for sorting in the storage system (11), that the height and/or width measuring device (64) is provided to feed a signal to the control device (57) and that the control device (57) is provided to feed a commanding signal to the sorting device (20) such that the sorting device (20) places a form stack (8) with a certain height and/or width and identity in a compartment with form stacks (8) with the same identity if there is room for the incoming form stack (8) in this compartment (14 or 15) or in another adjacent compartment (14 or 15), preferably an adjacent compartment (14 or 15) situated closer to a starting position (U) in the storage system (11) to which the form stacks (8) are transported.

21. Devices according to claim 20, characterized in that the height and/or width measuring device (64) includes arms (66) which are swung aside by form stacks (8) when they pass the arms (66), the value of the degree of pivot being fed to the control device (57) as a signal for the height and/or width of the form stacks (8).

22. Device according to anyone of claim 17, characterized in that the control device (57), when fed with a predetermined fetch code for a form stack (8) with a certain identity, is provided to feed a commanding signal to the sorting device (20) to fetch and remove the form stack (8) in question from the storage system (11).

23. Device according to claim 17, characterized in that the sorting device (20) comprises a sorting carriage (21) which is movable in horizontal direction along at least one compartment system (12 and/or 13), and a sorting table (22) mounted on the sorting carriage and movable in vertical direction thereon, that the sorting table (22) can be set in a starting position (U) in which it receives and delivers a form stack (8), that the sorting carriage (21) is provided to be controlled by commanding signals from the control device (57) to move in horizontal direction along the compartment system (12 and/or 13), and that the sorting table (22) is provided to be controlled by commanding signals from the control device (57) to move in vertical direction relative to the sorting carriage (21), whereby the sorting table (21) is movable in a vertical plane (VP) close to the compartment system (12 or 13) or between the compartment systems (12 and 13) from its starting position (U) in horizontal (X) and/or vertical (Y) direction to a compartment (14 or 15) in which the form stack (8) provided thereon shall be placed or from a compartment (14 or 15) from which a form stack (8) is fetched to its starting position (U).

24. Device according to claim 23, characterized in that the control device (57) is provided to emit commanding signals such that the sorting carriage (21) is moving relative to the compartment system (12 and/or 13) and simultaneously the sorting table (22) relative to the sorting carriage (21) so that the sorting table (22) moves along an inclined path (XY) from the starting position (U) to the compartment (14 or 15) in which the form stack (8) shall be placed for transporting the form stack (8) the shortest way between the starting position (U) and the compartment (14 or 15) or from a compartment (14 or 15) from which a form stack (8) is fetched to the starting position (U).

25. Device according to claim 24, characterized in that the sorting table (22) or an upper member (36) thereof is movable in horizontal direction (Z) for insertion a short distance into the compartments (14 or 15) for delivery of form stacks (8) therein or fetching of form stacks (8) therefrom and that the control device (57) is provided to emit commanding signals for inserting the sorting table (22) or the upper member (36) thereof into the compartment (14 or 15) in question when the sorting table (22) has reached a position in front of the compartment.

26. Device according to claim 25, characterized in that the upper member (36) which is displaceably mounted on the sorting table (22) comprises a feeding device (37) which is controlled through commanding signals from the control device (57) to feed a form stack (8) provided thereon down into a compartment (14 or 15) into which the upper member (36) is inserted, and that the upper member (36) is controlled by a commanding signal from the control device (57) to be simultaneously withdrawn from the compartment (14 or 15), whereby the speed of the feeding movement of the feeding device (37) and of the movement of withdrawal of the upper member (36) are coordinated with each other so that the form stack (8) falls straight down or substantially straight down into the compartment (14 or 15).

27. Device according to claim 26, characterized in that the sorting table (22) or the upper member (36) thereof is movable in horizontal direction for insertion a short distance into a compartment (14 or 15) situated under a compartment (14 or 15) from which a form stack (8) shall be fetched, that the control device (57) is provided to emit a commanding signal for insertion of the sorting table (22) or its upper member (36) into the lower compartment (14 or 15), that the control device (57) is provided to emit a commanding signal for elevating the sorting table (22) when the sorting table or the upper member (36) thereof has been inserted into the lower compartment (14 or 15) such that a feeding device (37) on the sorting table (22) or its upper member (36) from below passes through grooves (55) in the bottom (54) of the compartment (14 or 15) situated thereabove until the feeding device (37) has lifted the form stack (8) in the upper compartment (14 or 15), and that the control device (57) preferably is provided to emit a commanding signal for activating the feeding device (37) to feed the form stack (8) entirely up onto the sorting table (22) or its upper member (36) and preferably emit a commanding signal to simultaneously or thereafter withdraw the sorting table (22) or its upper member (36) from the compartment (14 or 15).

28. Device according to claim 23, characterized in that the control device (57) is provided to emit commanding signals for controlling the sorting table (22) or an upper member (36) thereof in horizontal direction (Z) when the sorting table (22) is situated in a starting position (U) and/or moved in horizontal (X) and/or vertical (Y, XY) direction.

29. Device for sorting form stacks in a storage system and removing the form stacks from the storage system, a printer (3) being provided for printing a continuous web (1) of forms, the forms being stacked into form stacks (8) in a device (7) adapted therefor, the form stacks (8) being transported continuously to the storage system (11) for continuous sorting into compartments (14 and/or 15) therein, the storage system (11) being provided in a cabinet (16) in which the compartments (14 and/or 15) are arranged, characterized in that
  a transport device (46) is provided to continuously transport the form stacks (8) into the cabinet (16);
  a movable sorting device (20) is mounted in the cabinet (16) for receiving form stacks (8) from the transport device (46) and continuously sort the form stacks (8) in the compartments (14 and/or 15);

the cabinet (16) can be closed such that form stacks (8) stored therein are inaccessible to unauthorized removal from the cabinet (16); and the form stacks (8) are removable from the cabinet (16) only by means of a code and/or key provided therefor.

30. Device according to claim 29, characterized in that the cabinet (16) includes two compartment systems (12 and 13) which are located on opposite sides of a space (19);

a sorting device (20) is movably mounted in the space (19) along the compartment systems (12 and 13);

the sorting device (20) comprises a sorting carriage (21) which is movable in horizontal direction (X) in the space (19);

the sorting carriage (21) has a sorting table (22) which is mounted thereon movable in vertical direction (Y);

the sorting table (22) can be set in a starting position (U) in which it can receive form stacks (8) from the transport device (46);

the sorting table (22) is provided to move a form stack (8) from the starting position (U) to a compartment (14 and/or 15) in which it shall be placed;

the sorting table (22) or an upper member (36) thereof is displaceable in horizontal direction (Z) for insertion into compartments (14 and/or 15) and withdrawal therefrom for placing form stacks (8) therein or for removal of form stacks (8) from the compartments (14 and/or 15);

the sorting table (22) is provided to move form stacks (8) fetched from the compartments (14 and/or 15) to the starting position (U); and a discharge device (47) is provided to receive form stacks (8) from the sorting table (22) when the form stack (8) is in the starting position (U) and to feed out or remove the form stacks (8) from the cabinet (16).

* * * * *